United States Patent [19]

Hoblingre

[11] Patent Number: 5,564,313
[45] Date of Patent: Oct. 15, 1996

[54] STEERING COLUMN ASSEMBLY, ESPECIALLY FOR A MOTOR VEHICLE

[75] Inventor: André Hoblingre, Valentigney, France

[73] Assignee: ECIA-Equipements et Composants pour l'Industrie Automobile, Audincoutr, France

[21] Appl. No.: 348,195

[22] Filed: Nov. 28, 1994

[30] Foreign Application Priority Data

Nov. 30, 1993 [FR] France .................... 93 14333

[51] Int. Cl.⁶ ............................ B62D 1/16; F16B 21/10
[52] U.S. Cl. ................ 74/492; 29/423; 280/779; 403/12; 403/377
[58] Field of Search ................ 74/492; 280/779, 280/780; 180/78; 403/11, 12, 377; 29/423, 434, 443, 444

[56] References Cited

U.S. PATENT DOCUMENTS

| 3,851,542 | 12/1974 | Adams et al. | 74/492 |
| 4,406,176 | 9/1983 | Numazawa et al. | 74/492 |
| 4,917,524 | 4/1990 | Wilcox | 403/12 |
| 5,025,678 | 6/1991 | Shinpo et al. | 180/78 X |
| 5,110,233 | 5/1992 | Hoblingre et al. | 403/12 |
| 5,221,154 | 6/1993 | Foulquier et al. | 403/12 |

Primary Examiner—Charles A. Marmor
Assistant Examiner—Troy Grabow
Attorney, Agent, or Firm—Sughrue, Mion, Zinn, Macpeak & Seas

[57] ABSTRACT

A steering column assembly for a motor vehicle includes a steering column shaft (1) mounted so that it can move rotatably inside a column body (2), and a restraining arrangement (5) for temporarily axially immobilizing the shaft within the body for fitting the assembly onto the rest of the structure of the vehicle, it being possible to move the restraining arrangement between an active immobilization position and a non-obstructing position. The restraining arrangement includes structure (10) for enabling a limited degree of axial movement of the shaft within the body when the arrangement is in the non-obstructing position.

6 Claims, 1 Drawing Sheet

STEERING COLUMN ASSEMBLY, ESPECIALLY FOR A MOTOR VEHICLE

BACKGROUND OF THE INVENTION

The present invention relates to a steering column assembly especially for a motor vehicle.

A certain number of steering column assemblies of this type are already known in the state of the art and include a steering column shaft mounted so that it can move in terms of rotation within a column body.

For various reasons connected, for example, with the use of particular guide bearings or the need to allow a certain axial movement of the shaft within the body, some of these assemblies have been equipped with means for temporary axial immobilization of the shaft within the body in order to allow the column assembly to be fitted onto the rest of the structure of the vehicle.

This is necessary in particular to allow correct positioning of the shaft relative to the rest of the steering gear of the vehicle while the assembly operator is connecting the corresponding end of the shaft to the rest of the steering gear of the vehicle.

Various embodiments of these means for temporary axial immobilization have already been proposed.

It is known, for example, that these immobilization means may include an immobilization stub comprising a grip ring at one of its ends and abutment surfaces at the other of its ends, this immobilization stub being engaged in a recess in the body so that the abutment surfaces of the latter extend on either side of a collar fixed to the steering column shaft in order to immobilize the latter within the body for the purpose of fitting this assembly to the vehicle.

Once this assembly has been accomplished, the operator withdraws this immobilization stub or moves it into a non-obstructing position in which it releases the collar and therefore the shaft.

The position of this shaft within the body is thus determined as a function of the structure of the steering gear and of the column assembly.

However, it has been observed that this structure had a certain number of assembly drawbacks in so far as it happens from time to time that the operators handle these column assemblies using the grip ring of the immobilization stub, which could result in the latter being moved into its non-obstructing position and therefore in a lack of immobilization of the shaft within the body while the assembly is being fitted to the vehicle.

It can be understood that this may have extremely severe consequences in so far as the safety of the connection of the shaft to the rest of the steering gear of the vehicle may be compromised.

SUMMARY OF THE INVENTION

The object of the invention is therefore to solve these problems.

To this end, the subject of the invention is a steering column assembly especially for a motor vehicle, of the type including a steering column shaft mounted so that it can move in terms of rotation inside a column body, and means for temporary axial immobilization of the shaft within the body for fitting the assembly onto the rest of the structure of the vehicle, it being possible for these means to be moved between an active immobilization position and a non-obstructing position, characterized in that it includes means for limiting the axial movement of the shaft within the body when the means for temporary axial immobilization are in the non-obstructing position.

The invention will be better understood from reading the description which follows, given solely by way of example and made with reference to the appended drawings, in which:

DESCRIPTION OF PREFERRED EMBODIMENTS

Figure 1:
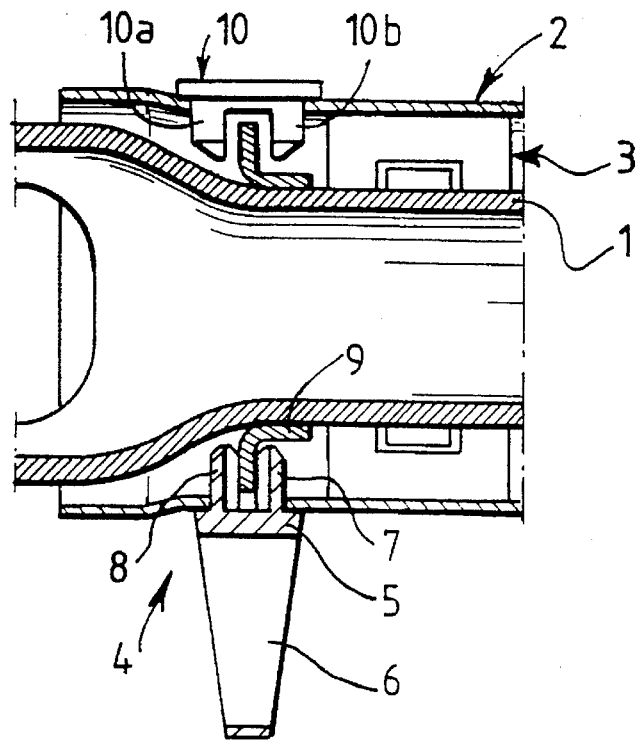
FIG. 1 represents a partial sectional view of a steering column assembly according to the invention, illustrating a first embodiment of means for limiting the axial movement of the shaft within the body.

As can be seen in FIG. 1, a steering column assembly according to the invention, especially for a motor vehicle, includes, in the conventional way, a steering column shaft denoted by the general reference 1 mounted so that it can move in terms of rotation within a column body denoted by the general reference 2.

Guide means 3 are, for example, provided between the shaft and the body.

Moreover, this column assembly includes also in the conventional way means 4 for temporary axial immobilization of the shaft within the body for fitting this assembly to the rest of the structure of the vehicle, it being possible for these means for temporary axial immobilization to be moved between an active position represented in this FIG. 1 and a non-obstructing position.

In fact, these means for temporary axial immobilization may include an immobilization stub 5, at one of its ends comprising a grip ring 6 and at the other of its ends comprising abutment surfaces 7 and 8.

This immobilization stub is engaged in a recess in the body and in its active position the abutment surfaces 7 and 8 extend on either side of a collar 9 of the shaft in order to provide temporary axial immobilization of this shaft within the body during assembly.

Once this assembly has been accomplished, the operator can withdraw this stub 5 in order to release the collar 9 and therefore the steering column shaft.

Other embodiments of this stub, which are known in the state of the art, comprise means such as notches allowing the operator to move this stub between an active position as represented and a non-obstructing position for releasing the collar and therefore the shaft.

In order to solve the various problems of assembly errors mentioned before, the steering column assembly according to the invention also includes means for limiting the axial movement of the shaft within the body when the means for temporary axial immobilization are in the non-obstructing position.

In the embodiment represented in this FIG. 1, these means for limiting the axial movement of the shaft within the body comprise a piece attached to the body 2, denoted by the general reference 10 and which is, for example, in the form of a plug inserted into a recess in the body.

This attached piece includes radial abutment surfaces 10a and 10b extending on either side of the collar 9 connected to the shaft and the separation of which allows a certain amount of axial movement of the shaft within the body, this permitted axial movement being limited in order to guarantee correct fitting of the steering column shaft to the rest of the steering gear of the vehicle and a sufficiently reliable connection of this shaft to this gear.

It can therefore be understood that even if the stub 5 for temporary axial immobilization is accidently withdrawn by the operator, the axial movement of the shaft within the body is limited by the presence of these movement-limiting means, in order to guarantee the safety of the connection of this shaft with the rest of the steering gear.

Of course it goes without saying that other embodiments of these limitation means may be envisaged.

Indeed, the arrangement of the abutment surfaces of these immobilization means may be reversed, that is to say that the collar located on the shaft may include two radial abutment surfaces extending on either side of a radially projecting part of the piece attached to the body.

The embodiment represented in FIG. 1 corresponds to a column assembly in which the stub 5 for temporary axial immobilization is completely withdrawn by the operator after the assembly has been fitted onto the rest of the structure of the vehicle.

Figure 2:
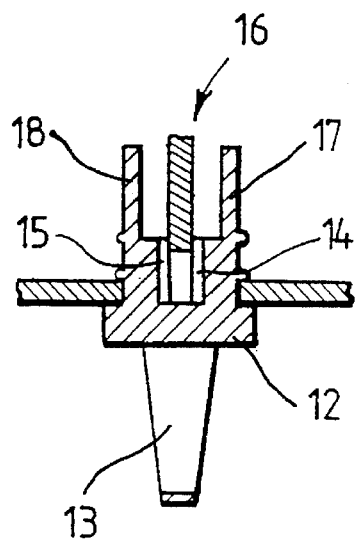
FIG. 2 represents a sectional view of an immobilization stub entering into the make-up of another embodiment of a steering column assembly according to the invention.

In FIG. 2 has been represented another embodiment of a steering column assembly according to the invention, in which the stub 12 for temporary axial immobilization is moved by the operator into a non-obstructing position once the assembly has been fitted to the vehicle.

In this case, this stub 12 still includes means such as a grip ring 13 allowing the operator to move it between an active position represented in this FIG. 2 and a non-obstructing position through a radial movement.

This stub 12 includes first radial abutment surfaces for temporary axial immobilization of the shaft within the body which are denoted by the references 14 and 15, between which there extends the collar 16 connected to the shaft.

However, second abutment surfaces denoted by the references 17 and 18 are also provided on this stub. These second abutment surfaces 17 and 18 have a greater separation than that of the first abutment surfaces 14 and 15 and, when the stub is in the non-obstructing position, allow the axial movement of the shaft within the body to be limited.

Indeed it can be understood that when the stub is in the non-obstructing position, the collar 16 and therefore the steering column shaft connected to this collar have a certain freedom for axial movement within the body, this freedom being defined by the separation between the second abutment surfaces 17 and 18 of the stub.

It will be noted that in the embodiment illustrated in this FIG. 2, the active and non-obstructing positions of this immobilization stub are defined, for example, by notches formed in the latter and interacting with the edges of the corresponding recess in the body.

Of course, a reverse arrangement of the abutment surfaces and of the collar may be envisaged, that is to say that the collar may be connected to the immobilization stub, while the radial abutment surfaces are connected to the steering column shaft.

What is claimed is:

1. In a steering column assembly for attachment to a motor vehicle, and including a steering column shaft (1) mounted so that it can move in rotation inside a steering column body (2), and first means (5; 12) for causing temporary axial immobilization of the shaft within the body for fitting the assembly onto the vehicle, said first means being movable between an active shaft-immobilization position and a non-obstructing position in which the shaft is not obstructed from axial movement, the improvement comprising second means (10; 12) for enabling a limited degree of axial movement of the shaft within the body when said first means are in the non-obstructing position.

2. Assembly according to claim 1, wherein the means for enabling a limited degree of axial movement of the shaft within the body comprise complementary surfaces (9, 10a, 10b; 16, 17, 18) for abutment of the shaft and of the body.

3. Assembly according to claim 2, wherein the complementary abutment surfaces of the shaft (1) are formed by a collar (9) fixed to the shaft and extending between abutment surfaces (10a, 10b; 17, 18) of a movement-limiting member (10; 12) connected to the body (2).

4. Assembly according to claim 3, wherein the movement-limiting member connected to the body is formed by a piece (0) attached in a recess of this body.

5. The assembly according to claim 3, wherein said first means for causing a temporary axial immobilization comprise:

an immobilization stub (12) including gripping means (13) and first abutment surfaces (14, 15) for causing the temporary axial immobilization of the shaft within the body when said stub (12) is in the active position; and second abutment surfaces (17, 18) for limiting the axial movement of the shaft within the body when said stub is in the non-obstructing position.

6. The assembly according to claim 5, wherein said second abutment surfaces (17, 18) have a greater axial spacing than that of said first abutment surfaces (14, 15).

\* \* \* \* \*